Patented Sept. 27, 1927.

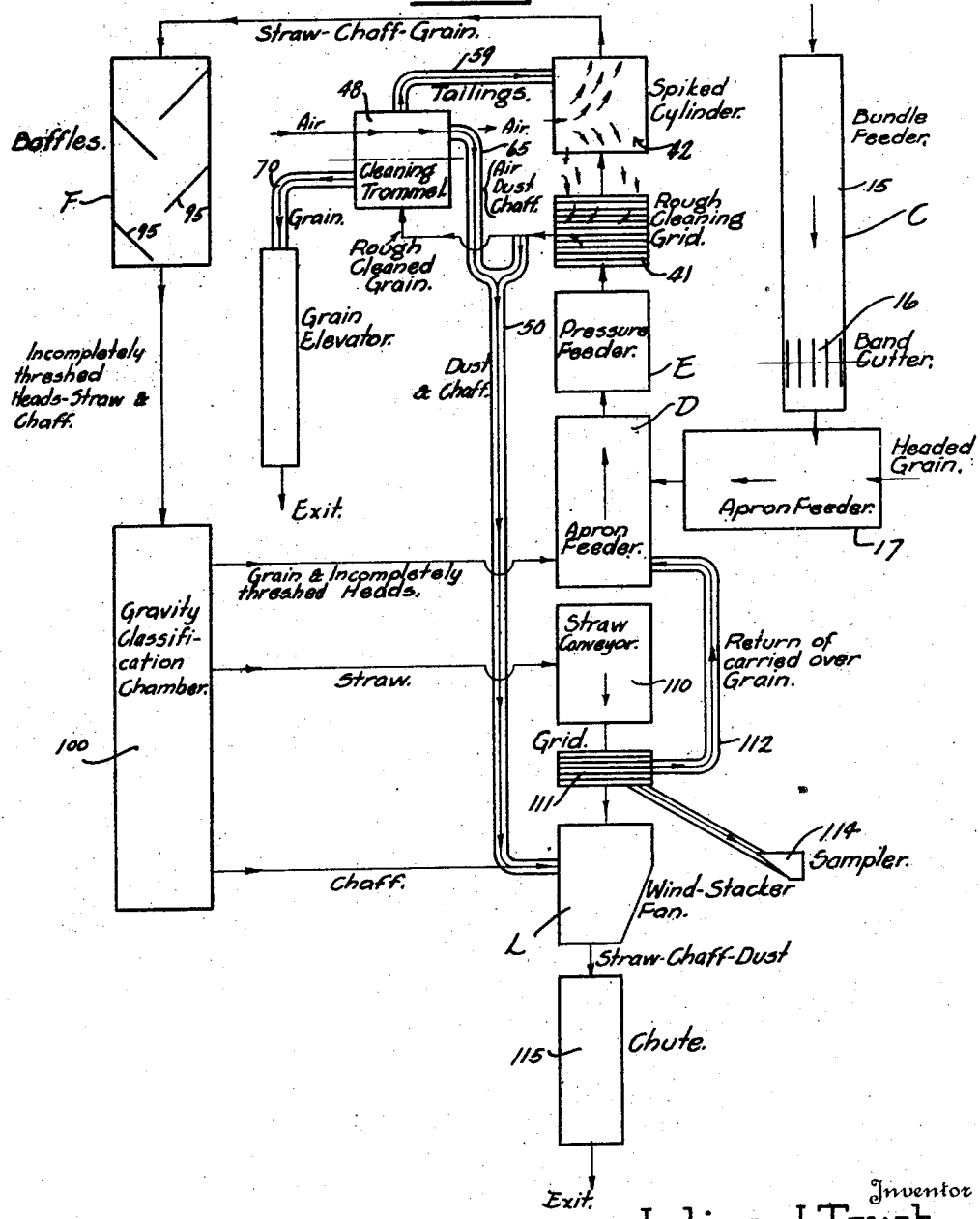

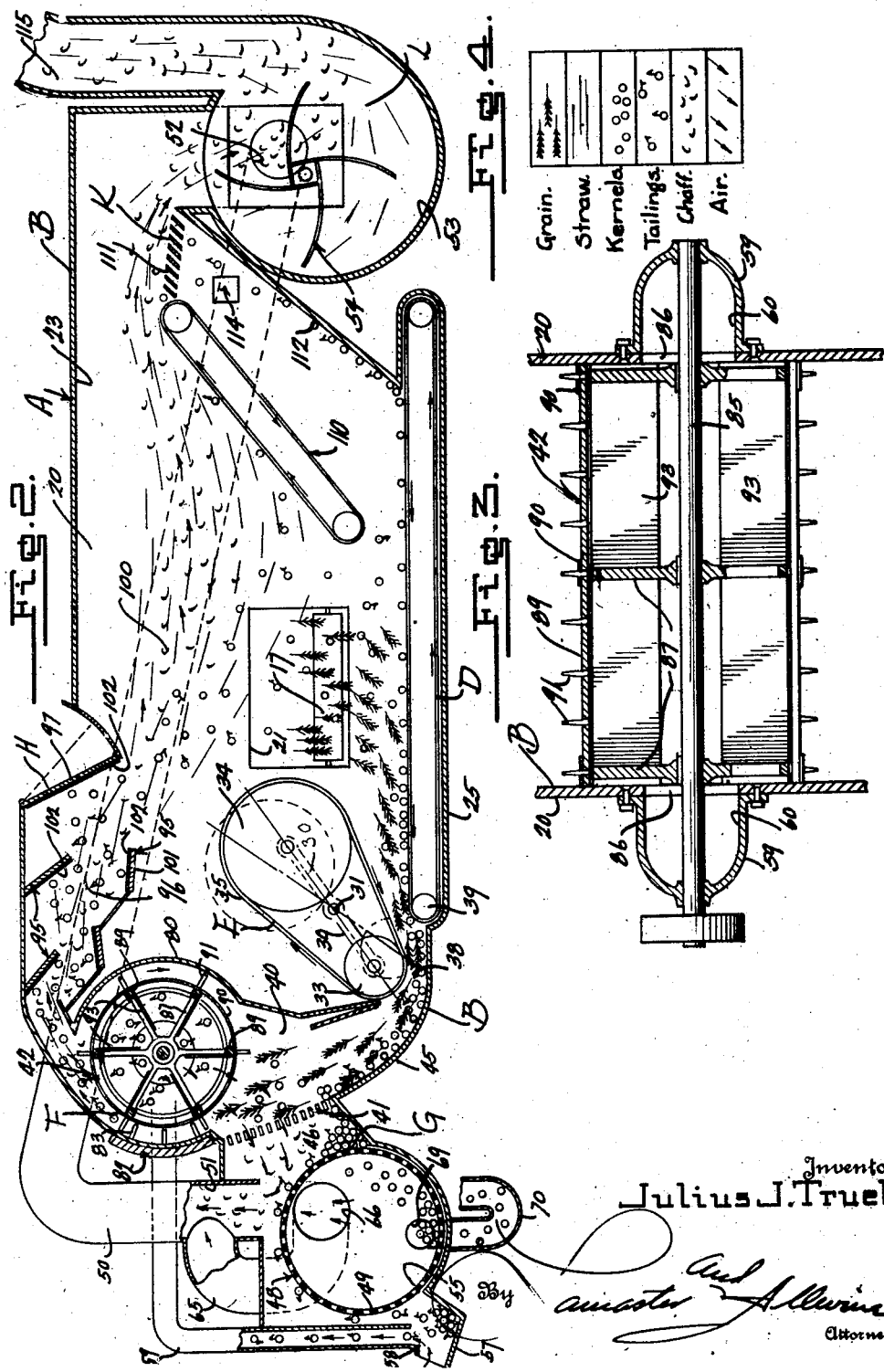

1,643,827

UNITED STATES PATENT OFFICE.

JULIUS J. TRUEB, OF BREWSTER, OHIO.

METHOD AND MACHINE FOR THRASHING GRAIN, ETC.

Application filed February 16, 1925, Serial No. 9,601. Renewed June 6, 1927.

This invention relates to improvements in thrashing machines particularly well adapted for the thrashing of grain, and embodying novel steps in the process or method of thrashing, and novel apparatus to accomplish the segregation of the kernels from straw and chaff.

A further object of this invention is the provision of an improved thrashing machine embodying a novel treatment of the grain, and by which segregation of loose kernels and other loosened particles such as dust, chaff, and the like, which result from agitation and attrition incidentally to handling and conveyance, is accomplished prior to the thrashing of the grain in the conventional spiked cylinders and concaves, and thus eliminating the necessity of passing such loosened material through the thrashing action.

A further object of this invention is the provision of a novel thrashing machine, which embodies a series of steps of treatment prior to the main thrashing action, for the removal of chaff, dust, and other like substances, and doing away with the necessity of passing them through the entire thrashing action, and thus providing a really effective dust control which greatly reduces the menace of smut explosions.

A further object of the invention is the provision of a novel combination thrashing cylinder and fan, and means to easily obtain samples to determine the efficiency of thrashing operation.

A further object of this invention is the provision of a method of thrashing grain of various kinds, beans, rice, or other crops, for the most effective and expeditious separation and segregation of the kernel from the chaff, straw, hulls, dust, and the like.

Other objects of this invention are the provision of novel apparatus for:—feeding the grain into the machine at a point between the thrashing cylinder and stacker fan; moving the unthrashed grain in a direction towards the thrashing mechanism and away from the stacker fan; rough cleaning the unthrashed grain prior to the main thrashing action; producing a thorough agitation and loosening of kernels by means of passage through a baffle duct; and causing the kernels to separate by gravity from a pneumatically conveyed mass of loosened kernels, chaff and straw.

Other objects and advantages of this invention will be apparent during the course of the following detailed description.

In the accompanying drawings, forming a part of this specification, and wherein similar reference characters designate corresponding parts throughout the several views, Figure 1 is a diagrammatic representation of the method of thrashing the grain according to this invention, and which diagrammatic view as is known to the art may be designated a flow sheet or milling program.

Figure 2 is a longitudinal cross sectional view taken through the improved thrashing machine, showing somewhat diagrammatically the arrangement of apparatus, in its preferred relation of parts.

Figure 3 is a cross sectional view taken longitudinally of a novel type of thrashing cylinder, which in accordance with this invention is provided with structure which enables the same to function also as a blower fan.

Figure 4 is a diagrammatic view of a legend used in connection with the functioning of the parts illustrated in Figure 2.

In the drawings, wherein for the purpose of illustration is shown diagrammatically the various steps of the improved method of thrashing grain, and the preferred arrangement of apparatus to carry out such method, the letter A may generally designate the improved thrashing machine, which may include a housing B; conveyor means C to feed the bundles or headed grain onto a main endless conveyor D. Pressure feed mechanism E of any approved character may be provided for regulating feed of the unthrashed grain into thrashing relation with novel thrashing apparatus F. Grain segregating and feeding apparatus G is provided cooperably located with respect to the pressure feeder E and the thrashing mechanism F. Grain baffling mechanism H is provided for treating the grain after passage through the mechanism F, and from whence the grain passes pneumatically for further treatment in apparatus K for final segregation of kernels. Blower mechanism L is provided at the exit end of the thrashing machine for discharging foreign materials such as dust, chaff, straw, and the like.

Referring more specifically to the details of the improved thrashing machine A, and in connection with the preferred method by which the grain is thrashed, if it is desired bundle feed the grain into the thrashing machine A, a conventional bundle feeder 15 of any approved character is provided in connection with the thrasher A, which is cooperatively situated to the other parts of the mechanism, as is diagrammatically illustrated in Figure 1 of the drawings, so that the bundles of grain may pass thereover into band cutting relation with the band cutter 16 of conventional character. The cut bundles are then passed onto the apron feeder 17, which is rotatable, and in the nature of an endless belt, appropriately supported in any approved manner by the housing B of the thrashing machine A, and which enters a side wall 20 of the housing B thru an opening 21, at a point in the housing chamber 23 between the pressure feed mechanism E and the apparatus K for final treatment of the grain. This apron feed belt or conveyor 17 conveys the grain as is illustrated in Figures 1 and 2 onto the main conveyor or apron feeder D which is rotatably carried at the bottom 25 of the housing B, longitudinally within the housing. The conveyor D travels at right angles to the transverse feeder conveyor 17, and the grain falling upon the upper strand of the main conveyor D is conveyed forwardly in the machine in the direction of the pressure feeder E. If it is desired to thrash headed grain from the stack the bundle feeder and band cutter are not used, and grain is fed directly upon the feeder conveyor 17.

Referring to the improved pressure feeding apparatus E, the same may be of any approved character, and the functions of which are, first, to provide a positive and well regulated feed of the unthrashed grain, in measurable quantities toward the treating and thrashing mechanism, and for the purpose of preventing air pressure interfering with the feed of grain toward the spiked cylinder and concave thrashing apparatus F. The pressure feed mechanism E more specifically may comprise a frame 30, pivoted between its ends at 31 in the housing B, and providing end rollers 33 and 34 which have an endless belt 35 trained thereover, and driven in the direction illustrated in Figure 2 of the drawings. This pressure feed mechanism E is adjustable on its pivot 31, by an overload release mechanism, and the forward and lower roller 33 regulates the width of the way 38 between the lowermost end of the pressure feeder and the housing B, adjacent the forward roller 39 of the horizontal main conveyor D. The lower lap of the endless belt 35 is disposed in a converging relation with respect to the horizontal main conveyor D, towards the way 38, and the height of this way 38 may be regulated to properly control the pressure application and consequently the feed of the grain into the compartment 40 leading to a rough cleaning grid 41 and to the thrashing mechanism F. The pressure feeder mechanism E is thus an important feature of the apparatus of the thrasher A, and defines a novel step of the method by which accurate gauging of the quantity of the grain fed into the machine is accomplished, for controlling and limiting delivery to the cylinder thrashing mechanism F.

Referring to the rough cleaning grid 41, which is in reality a part of the grain segregating and cleaning mechanism G, the same is preferably mounted in the path of travel of the grain from the pressure feeder E towards the spiked cylinder 42 of the mechanism F; this grid or grating 41 preferably comprising spaced bars located on an incline to the vertical, upon a forwardly and upwardly inclined wall portion 45 of the housing B, so that grain kernels which have become loosened incident to handling, attrition, and passing through the pressure feeder E may pass therethrough into the compartment 46 wherein is located the segregating and cleaning mechanism G. Not only kernels which have become so loosened pass the grid 41, but also straw, chaff, and dust may pass therethrough.

The very important feature of the rough cleaning grid 41, is that the same is located to receive the loosened grain, chaff, etc. at a point in advance of the thrashing mechanism F, since it is highly desirable to keep the same from passing through the spiked thrashing cylinder. Continuing with the treatment of the loosened grain, tailings, chaff, and other foreign materials in the compartment 46, after passing the rough cleaning grid 41, a cylinder 48 is mounted in this compartment 46, which may be appropriately termed a cleaning trommel, and provides a cylindrical shaped perforate shell 49. A conduit or stack 50 is connected in the upper portion of the compartment 46, providing a duct 51 which leads from the upper portion of the compartment 46, above the cleaning trommel 48, and outlets at 52 in the fan chamber 53, wherein the wind stacker fan 54 is provided. The suction and draft of air created thru this duct 51 causes chaff, dust, and other light foreign substances to be short circuited directly to the blower fan compartment, without the necessity or opportunity of passing through the spiked cylinder 42 and other parts of the thrashing machine A. This is a very important advantage, since it constitutes a really effective dust control, and greatly reduces the menace of smut explosion.

The cleaning trommel 48 is really a cylindrical shaped rotating screen, and the cleaned grain is admitted through the perforations in the shell 49, into the compartment 55 within this trommel 48. The tailings, as is illustrated in Figure 2 will not pass through the screen 48, but will be carried incident to rotation of the screen, about the periphery thereof, or in a path about the periphery, into a trough or other device 57, with the compartment 58 of which a slot 59 communicates, and in which slot an air suction is created during operation of the mechanism F, by the fan arrangement embodied in the spiked cylinder 42, and which will be subsequently described, so that the tailings are drawn from the compartment 58, and pneumatically conveyed into the spiked cylinder 42, and discharged therefrom after being subjected to an agitating and thrashing action.

In connection with the operating of the fan embodied as part of the spiked cylinder 42, it is to be noted that a considerable blast of air is created, which is sufficiently vigorous to cause a portion of the same to pass thru the rough cleaning grid 41, causing the loosened kernels, dust, chaff, and the like to pass therethrough.

The grain entering the compartment 55 of the cleaning trommel 48 is therein subjected to a final cleaning, which is obtained by connecting a conduit 65 into an end wall of this trommel, having an opening 66 leading into the compartment 55 of the trommel; the conduit 65 communicating with the duct 51 of the stack or conduit 50 so that the suction in the conduit 50 may cause the chaff and other foreign materials to separate from the kernels; the latter passing through an opening or duct 69 into a suitable conveyor or conduit 70, from whence they are elevated in any approved manner to the weigher and bagger.

Referring to the improved mechanism F, the same is preferably mounted in the upper end of the chamber 40, and a wall 80 separates this chamber 40 from the classification chamber 100, so that the blasts of air created by action of the spiked cylinder fan structure 42 will be properly directed into the grid 41 and into the way through the baffle duct arrangement H. This wall 80 extends from the pressure feed roller 33 upwardly and about the portion of the circumference of the spiked cylinder 42 to a point of connection with the duct arrangement H to be subsequently described.

It will of course be understood by anyone skilled in the art to which this invention relates that the grain passes to the spiked cylinder structure 42, between the spiked periphery thereof and the spiked concave structure 82, where the kernels remaining in the grain heads are thrashed out. The concave device, or merely concave as it is known to the art, is carried by the thrasher housing B, and provided with a concave surface facing the spiked cylinder 42, upon which a series of spikes or teeth 83 are provided in staggered meshing relation with the teeth of the spiked cylinder 42, whereby upon rotation of the spiked cylinder the unthrashed grain will be torn and positively moved in a violent manner to thrash the kernels from the grain heads.

Referring to the spiked cylinder structure 42, the same differs in construction from the conventional type, in that it is developed into a blower fan, and the ends thereof are open instead of being closed. The main object of such construction is to subject the grain as it passes over the rough cleaning grid just prior to entering the spiked cylinder, to an air blast which finds an outlet thru the rough cleaning grid 41, and to provide an air blast which will direct the mass of straw, chaff, kernels, etc. which pass through the spiked cylinder into the baffle duct arrangement H, at a high velocity.

The spiked cylinder fan construction preferably comprises a shaft 85, which rotatably bears in the side walls of the housing B in any approved manner. In Figure 3 has been illustrated one form which the invention may assume, and in this view the conduits 59 are secured to the side walls 20 of the housing B, and the shaft 85 bears in these conduits; the passageways 60 through the conduits 59 being open to the interior of the spiked cylinder structure 42, by means of openings 86 provided in the side walls 20. End and intermediate spiders 87 are keyed to the shaft 85, each of the same preferably comprising a hub portion with radially extending spokes and a circumferential rim. At the periphery of these rim portions a series of spaced spike supporting bars 89 are carried in parallel relation with each other and with the axis of the shaft 85, and circumferentially secured in spaced relation about these bars 89 are spike supporting rings 90. By this arrangement the interior of the spiked cylinder 42 is open at its ends to the conduit passageways 60, and the spiked cylinder is open at its periphery in the space between the bars 89 and the rings 90. The bars 89 and rings 90 of course carry the conventional spikes 91, which are disposed in a cooperating meshing relation with respect to the spikes of the concave 82. As an important feature of the invention, vanes 93 are carried within the spiked cylinder, by the spokes of the spiders 87, as is illustrated in Figures 2 and 3 of the drawings, these vanes preferably terminating short of the shaft 85 to permit the current of air to pass inwardly from the ways 60, upon rotation of the apparatus F, so that the same will act as a blower fan for directing blasts of air into the chamber 40 below the spiked cylinder and into the duct way of the baffle arrangement H.

Referring to the operation of the spiked cylinder and fan structure 42, the same thrashes the grain as above mentioned, and in addition upon rotation thereof, the vanes 93 will force the air from between them outwardly, producing an area of greater than atmospheric pressure at its circumference, and tending to cause a partial vacuum within the spiked cylinder. The blast of air thus created will leave by way of the rough cleaning grid 41 and baffle duct arrangement H, as above described. The air for said blast is drawn through the passageways 60 of the conduits 59, and thus pneumatically conveys the tailings after the same have passed the cleaning trommel 48, upwardly through the conduits 59 and to the interior of the spiked cylinder 42. These tailings following the air currents may leave by way of the baffle duct arrangement at the top of the machine, and they will fall upon the grain entering the cylinder from the chamber 40. In the latter case the tailings will be drawn through the concave 82 and the spiked cylinder 42, along with the grain, and if the tailings have been cleaned by action of the vanes 93, the kernels will drop incident to gravity, and assisted by the blasts of air will slip through the incoming feed of grain, and leave by way of the rough cleaning grid 41. It will be readily understood that this can take place since upon leaving the pressure feed device E the unthrashed grain is released in the compartment 40 and permitted to spread and loosen, so that the loose kernals in the chamber 40 will slip down through the mass of unthrashed grain, and be carried by the vigorous air blasts which takes place through the ascending grain, into the cleaning compartment 46. Such action of the kernels will also assist in breaking loose other kernels from the incoming grain, and liberating chaff, dust, etc. all of which will leave by way of the rough cleaning grid 41.

The improved baffle duct arrangement H is a novel departure from conventional thrashing practice, in that instead of abruptly stopping the mass of straw and grain, as by conventional wing beaters, or similar apparatus, the rush of grain as it passes the concave and spiked cylinder is permitted to spend its force gradually, by means of being passed through a series of baffles 95, which cause the mass to change its direction a plurality of times during its travel through the duct or way 96 defined by these baffles; the resulting attrition and agitation serving to free any entrapped kernels from the straw. These baffles 95 are arranged in an upper series and a lower series, with the planes thereof in convergent relation from the spiked cylinder, to provide the tortuous way or baffle duct 96. It is preferred to provide a last baffle 97, in the nature of a closure in the top wall of the housing B, against which the grain strikes on its passage from the baffle duct 96 into the classification chamber 100.

The baffles 95 are preferably of special formation, comprising supporting boards or plates 101 faced with resilient material 102, such as rubber. The kernels being thrown against the resilient material 102 of said baffles, which of course faces the duct 96, will be deflected with practically undiminished speed through the mass of straw and grain travelling through the duct 96, and of course with little liability of fracture incident to impact with the baffles 95. The straw on the other hand upon impact with the somewhat resilient surface 102 will not glance off, as do the heavy and hard kernels, but will rather have a tendency to turn end for end and thus be projected into the mass following it. This will cause within the mass in the baffle duct 96 a considerable agitation which is very beneficial in so far as thrashing action is concerned, and will cause the mass of matter in the baffle duct to emerge therefrom into the classification chamber, in the best possible condition, so that the kernels will be free to drop by gravity, and the chaff, dust, straw, and other foreign materials to be pneumatically conveyed across the classification chamber to the conveyor or apron 110.

The grain which is unthrashed, and the kernels will fall upon the main conveyor D, and will be returned by way of the pressure feed device E into the compartment 40, and in which the kernels will pass thru the rough cleaning grid 41 and the unthrashed grain passes into the spiked cylinder mechanism for further treatment. In this respect the improved thrasher A embodies a novel step which is not at present conventional practice, and thereby a greater yield of kernels is obtained.

As before mentioned the straw and other foreign materials being lighter than the kernels which drop from the classification chamber 100 onto the conveyor D; such straw and other matter will be carried over upon the upwardly inclined conveyor or straw apron 110. This apron operates upwardly and to the rear, towards the stacker fan construction L, and co-acts with the pneumatic draft through the chamber 23 of the thrashing machine housing to carry the straw, chaff, etc. towards the grid 111, which is mounted in the machine at the upper end of the conveyor 110 and to the rear thereof. This grid 111 is part of the mechanism K, and is placed to receive therethrough any grain or tailings which are carried over with the straw. Such grain and tailings fall through the grid 111 and slide downwardly upon the inclined wall 112, which is part of the housing B. A sampler box or analogous testing device 114 may be placed in the space below the grid 111, within which part of the kernels, grain, and tailings coming through the grid 111 will drop, in order that a check may be obtained by the operator upon efficiency of the thrashing action of the machine, and to guide the operator in making adjustments to obtain the maximum yield of grain.

The straw, chaff, and other foreign materials after passing the grid 111 pass into the fan compartment 53, which is of conventional design, and are discharged through the telescope chute 115, of any approved construction.

From the foregoing description of this invention it is apparent that a novel method of thrashing grain has been provided including a sequence of steps for the best separation of the kernels from the straw and chaff, and embodying apparatus by which the method is carried out, which is arranged in a novel and radically different manner from conventional construction.

Various changes in the shape, size, and arrangement of parts, as well as departure from the given sequence of steps by which the grain is thrashed, may be made in the invention herein illustrated and described, without departing from the spirit of the invention or the scope of the claims.

I claim:

1. Those steps in the process of thrashing grain which consist in sifting a mass of unthrashed grain, pneumatically forcing a blast of air through the mass of unthrashed grain as it is being sifted to force kernels, chaff, dust, and other foreign materials from said unthrashed grain, and subsequently thrashing the grain and segregating kernels therefrom.

2. That process of thrashing grain which consists in sifting an unthrashed mass of grain, forcing a blast of air through the mass of grain and grid to carry loosened kernels, chaff, dust, and foreign materials from the unthrashed grain, thrashing the unthrashed mass of grain to loosen the kernels from the straw and chaff thereof, separating the kernels last mentioned from the straw and chaff, and cleaning and segregating the straw and chaff from the kernels which have been sifted as first mentioned.

3. That process of thrashing grain which consists in sifting an unthrashed mass of grain, forcing a blast of air through the mass of grain to carry loosened kernels, chaff, dust, and foreign materials from the unthrashed grain, thrashing the unthrashed mass of grain to loosen the kernels from the straw and chaff thereof, separating the kernels last mentioned from the straw and chaff, cleaning and segregating the straw and chaff from the kernels which have been sifted as first mentioned, and been loosened as first mentioned, and combining all of the kernels which have been loosened by the different operations.

4. That process of thrashing grain which consists in conveying the grain and sieving the loosened grain and foreign materials from the mass of unthrashed grain, subsequently thrashing the grain to loosen the kernels from the straw and chaff, pneumatically converging and baffling the kernels and said chaff to further separate kernels from the straw, and segregating the kernels after sieving and baffling from the chaff, dust, and straw.

5. That process of thrashing grain which consists in conveying a mass of unthrashed grain into a mechanical thrashing mechanism to tear the kernels loose from the straw and chaff, pneumatically conveying the loosened kernels, straw and chaff through a chamber above the unthrashed grain which is being conveyed, in such manner that the heavier loosened kernels will fall into the mass of unthrashed grain being conveyed toward the mechanical thrashing mechanism, removing said kernels and other loosened kernels from said grain, and removing the loosened straw and chaff from the thrashing zone.

6. That process of thrashing grain which consists in conveying a mass of unthrashed grain into a mechanical thrashing mechanism to tear the kernels loose from the straw and chaff, pneumatically conveying the loosened kernels, straw and chaff through a chamber above the unthrashed grain which is being conveyed, in such manner that the heavier loosened kernels will fall into the mass of unthrashed grain being conveyed toward the mechanical thrashing mechanism, removing said kernels and other loosened kernels from the unthrashed grain, removing the loosened straw and chaff from the thrashing zone, and further treating said straw and chaff for removal of the remaining kernels.

7. That method of thrashing grain which consists in conveying a mass of unthrashed grain towards a thrashing mechanism, pressure feeding the mass of unthrashed grain towards the thrashing mechanism, sifting the loosened grain, straw, chaff and dust from the unthrashed body of grain prior to entrance through said thrashing mechanism, pneumatically conveying the loosened grain after passage through said thrashing mechanism, and separating the loosened kernels from the straw and chaff and segregating the same.

8. Those steps in the method of thrashing grain which consist in force feeding a body of unthrashed grain, pneumatically sieving the said unthrashed grain for carrying loosened grain, dust, and chaff from the body of unthrashed grain, thrashing the body of unthrashed grain to loosen kernels, straw and chaff, pneumatically baffling and conveying the mass after thrashing over a tortuous path to further separate kernels from said straw in said mass, segregating the kernels which have been sieved from dust and chaff, and separating kernels from straw and chaff subsequent to baffling.

9. That method of thrashing grain which consists in conveying a mass of unthrashed grain, providing a positive feed for the mass of unthrashed grain, causing a blast of air to travel transversely through said mass of unthrashed grain for segregating kernels and loosened chaff and dust, thrashing the remaining mass of unthrashed grain to loosen the kernels therefrom, pneumatically conveying the thrashed mass through a baffled way to further loosen kernels from the thrashed mass by attrition and agitation, causing the loosened kernels, chaff, and straw to be pneumatically conveyed thru a chamber over a path of sufficient length so that the kernels will drop by gravity from the pneumatically conveyed straw and chaff, and segregating the kernels.

10. That method of thrashing grain which consists in conveying a mass of unthrashed grain, force feeding the mass of unthrashed grain, causing a blast of air to travel transversely through said mass of unthrashed grain for segregating kernels and loosened chaff and dust, thrashing the remaining mass of unthrashed grain to loosen the kernels therefrom, pneumatically baffling the thrashed mass to further loosen kernels from the thrashed mass by attrition and agitation, causing the loosened kernels, chaff and straw to be pneumatically conveyed over a path of sufficient length so that the kernels will drop by gravity from the pneumatically conveyed straw and chaff, segregating the kernels, and sieving the straw and chaff which have been pneumatically conveyed by said last step of the method for further separation of kernels and tailings from the worthless straw and chaff.

11. That method of thrashing grain which consists in first cleaning a body of unthrashed grain to separate loose kernels and tailings therefrom, causing the resultant body of unthrashed grain to undergo a thrashing operation to loosen the grain kernels therefrom, subsequently treating the thrashing grain for segregation of kernels from the straw and chaff, removing and segregating the tailings from the kernels which have been separated from the mass of unthrashed grain of said first cleaning step of the method, and conveying said tailings for treatment in the thrashing operation above mentioned to cause loosening of the kernels therefrom.

12. In a thrashing machine the combination of a housing, a spiked thrashing cylinder in the housing, means for feeding a body of unthrashed grain towards said spiked thrashing cylinder, means for separating loose kernels and tailings and dust from the body of unthrashed grain prior to entering said spiked thrashing cylinder, means for treating the kernels and tailings and dust which have been so removed to segregate the kernels, means for removing the dust and other foreign materials incident to segregation of the grain by said last mentioned means, fan means associated with said spiked cylinder for pneumatically conveying tailings above mentioned into said spiked cylinder for thrashing treatment, and means for treating the kernels, straw and chaff subsequent to thrashing action by said spiked cylinder for segregation of the kernels from said straw and chaff.

13. In a thrashing machine the combination of a thrashing housing, thrashing mechanism located at one end of the housing, suction fan means carried at the opposite end of the housing for creating a draft of air flowing through the housing chamber from the thrashing mechanism toward the suction fan means for pneumatically conveying the thrashed grain after passing said thrashing unit, and means for feeding the body of unthrashed grain into the housing at a point between the thrashing unit and fan and below the pneumatically conveyed thrashed grain for conveyance to said thrashing unit.

14. In a thrashing machine the combination of a housing, a thrasher unit, means for feeding grain thru the thrasher unit, a baffle device for receiving grain direct from the thrasher unit including a plurality of baffles having resilient baffle faces, and means for pneumatically feeding the grain into said baffle device.

15. In a thrashing machine the combination of a housing, a thrasher unit, means for feeding grain to the thrasher unit, a baffle device including a plurality of baffles obliquely disposed in opposite facing relation defining a tortuous way therebetween with its inlet at said thrasher unit, means for pneumatically feeding grain after thrashing into said baffle device, and means for segregation of kernels after baffling.

16. In a thrashing machine the combination of a housing, a thrasher unit, means for feeding grain to the thrasher unit, a baffle device including a series of baffles disposed in opposed facing relation defining a tortuous way therebetween having its inlet directly at said thrasher unit, said baffles having obliquely arranged resilient faces against which the grain is adapted to strike as it travels through said tortuous way, means for pneumatically forcing the said grain after thrashing into said baffle device, and means for segregation of kernels, straw and chaff after passing thru said baffle device.

17. In a thrashing machine the combination of a housing, a conveyor mounted in the housing, a thrashing unit, means for conveying a body of unthrashed grain from said conveyor into said thrashing unit, a series of baffles disposed in oblique opposed relation leading from said thrashing unit for the purpose of receiving a thrashed body of grain from said thrashing unit and providing a tortuous path exiting above said first mentioned conveyor, and means for pneumatically conveying the thrashed material as it exits from said tortuous path between said baffles through said housing a sufficient distance to permit gravity separation of the kernels from the straw and chaff, and means to insure conveyance of the worthless straw and chaff from said kernels.

18. In a thrashing machine the combination of a housing, a thrashing unit in the housing, means for conveying a body of unthrashed grain to said thrashing unit to cause loosening of the kernels therefrom, means for segregating the kernels from the straw and chaff in said housing, a conveyor adapted to receive the body of straw and chaff subsequent to said segregating, fan suction means for withdrawing the straw and chaff from said conveyor, and a grid over which said straw and chaff is adapted to pass located between said last mentioned conveyor and suction fan for causing gravity separation of tailings and kernels which may have remained in said straw and chaff after the first mentioned gravity separation of the kernels.

19. In a thrashing machine the combination of a housing having a compartment therein, means for feeding unthrashed grain into the housing, a thrashing unit, means for conveying a body of unthrashed grain along said compartment towards said thrashing unit, means for screening from said body of unthrashed grain prior to entering said thrashing unit the loosened kernels, tailings, dust and foreign materials, means for treating the said screened material to segregate the kernels from the tailings, dust and chaff, means for pneumatically removing the chaff and dust, means for conveying said tailings into the thrashing unit together with the body of unthrashed grain, and means for pneumatically conveying and treating the thrashed grain for the segregation of the chaff and foreign materials from the kernels.

20. In a thrashing machine the combination of a housing having a compartment therein, a thrashing unit in the housing, a screen in the compartment, means for passing a body of unthrashed grain over said screen towards said thrashing unit, a cleaning trommel below the screen for receiving thereon kernels, tailings, chaff, and dust screened from the body of unthrashed grain, means cooperating with the cleaning trommel to segregate the kernels from the tailings and chaff, means for pneumatically segregating the chaff and dust from the tailings adjacent the cleaning trommel, means for conveying the tailings from adjacent the cleaning trommel to said thrashing unit, baffle means adjacent the thrashing unit, means for pneumatically conveying the thrashed grain from the thrashing unit thru the baffle means and upwardly thru the housing compartment longitudinally thereof above the body of unthrashed grain, over a course and under such pneumatic action that the kernels may drop from the chaff and dust into the body of unthrashed grain which is moving towards the thrashing unit and screen, and means for further removing remaining kernels from the material which has been pneumatically conveyed longitudinally thru the compartment of the housing as above mentioned.

JULIUS J. TRUEB.